United States Patent
Goren et al.

(10) Patent No.: US 9,934,177 B2
(45) Date of Patent: Apr. 3, 2018

(54) METHODS AND SYSTEMS FOR ACCESSING STORAGE USING A NETWORK INTERFACE CARD

(71) Applicant: QLOGIC Corporation, Aliso Viejo, CA (US)

(72) Inventors: Nir Goren, Herut (IL); Rafi Shalom, Petah Tikva (IL); Kobby Carmona, Hod Asharon (IL)

(73) Assignee: Cavium, Inc., San Jose, CA (US)

( * ) Notice: Subject to any disclaimer, the term of this patent is extended or adjusted under 35 U.S.C. 154(b) by 268 days.

(21) Appl. No.: 14/667,485

(22) Filed: Mar. 24, 2015

(65) Prior Publication Data

US 2016/0124880 A1    May 5, 2016

Related U.S. Application Data

(60) Provisional application No. 62/075,158, filed on Nov. 4, 2014.

(51) Int. Cl.
| | |
|---|---|
| *G06F 13/36* | (2006.01) |
| *G06F 13/28* | (2006.01) |
| *G06F 13/12* | (2006.01) |
| *G06F 13/32* | (2006.01) |
| *G06F 3/06* | (2006.01) |

(Continued)

(52) U.S. Cl.
CPC .............. *G06F 13/32* (2013.01); *G06F 3/067* (2013.01); *G06F 3/0619* (2013.01); *G06F 3/0679* (2013.01); *G06F 12/1081* (2013.01); *G06F 13/128* (2013.01); *G06F 13/28* (2013.01); *H04L 67/1097* (2013.01); *H04L 67/2842* (2013.01);

(Continued)

(58) Field of Classification Search
None
See application file for complete search history.

(56) References Cited

U.S. PATENT DOCUMENTS

| | | |
|---|---|---|
| 5,978,951 A | 11/1999 | Lawler et al. |
| 7,152,122 B2 | 12/2006 | Kagan et al. |

(Continued)

FOREIGN PATENT DOCUMENTS

WO    WO-2005/093588    10/2005

OTHER PUBLICATIONS

"International Search Report from ISA/KR dated Jan. 12, 2016 for International Application No. PCT/US2015/051497".

(Continued)

*Primary Examiner* — David E Martinez
(74) *Attorney, Agent, or Firm* — Klein, O'Neill & Singh, LLP

(57) ABSTRACT

Methods and systems for efficiently processing input/output requests are provided. A network interface card (NIC) is coupled to a storage device via a peripheral link and accessible to a processor of a computing device executing instructions out of a memory device. The NIC is configured to receive a read/write request to read/write data; translate the read/write request to a storage device protocol used by the storage device coupled to the NIC; notify the storage device of the read/write request, without using the processor of the computing device, where the storage device reads/writes the data and notifies the NIC; and then the NIC prepares a response to the read/write request without having to use the processor of the computing device.

21 Claims, 6 Drawing Sheets

(51) Int. Cl.
 *G06F 12/1081* (2016.01)
 *H04L 29/08* (2006.01)
(52) U.S. Cl.
 CPC ............ *G06F 2206/1014* (2013.01); *G06F 2212/2532* (2013.01); *Y02B 60/1228* (2013.01)

(56) References Cited

U.S. PATENT DOCUMENTS

| | | | |
|---|---|---|---|
| 7,688,838 | B1 | 3/2010 | Aloni et al. |
| 2002/0091844 | A1 | 7/2002 | Craft et al. |
| 2005/0144223 | A1 | 6/2005 | Yang et al. |
| 2005/0198410 | A1 | 9/2005 | Kagan et al. |
| 2010/0332612 | A1 | 12/2010 | Johnsen et al. |
| 2011/0246597 | A1 | 10/2011 | Swanson et al. |
| 2011/0276746 | A1 | 11/2011 | Pruthi et al. |
| 2013/0198312 | A1* | 8/2013 | Tamir .................. G06F 15/167 709/212 |
| 2014/0019808 | A1 | 1/2014 | Alanis et al. |
| 2014/0032696 | A1 | 1/2014 | Pinkerton et al. |
| 2014/0122634 | A1 | 5/2014 | Conner et al. |
| 2014/0180665 | A1* | 6/2014 | Naydon .................. G06F 9/455 703/25 |
| 2015/0254088 | A1* | 9/2015 | Chou .................. G06F 9/45541 709/212 |

OTHER PUBLICATIONS

"Written Opinion from ISA/KR dated Jan. 12, 2016 for International Application No. PCT/US2015/051497".
Matthews, Shane "NVM Express: SCSI Translation Reference", NVM Express Workgroup,1-54.
"International Search Report from ISA/KR dated Dec. 16, 2015 for International Application No. PCT/US2015/051513".
"Written Opinion from ISA/KR dated Dec. 16, 2015 for International Application No. PCT/US2015/051513".
"International Preliminary Report on Patentability from the International Bureau of WIPO dated May 18, 2017 for PCT Application No. PCT/US2015/051497".
"International Preliminary Report on Patentability from the International Bureau of WIPO dated May 18, 2017 for PCT Application No. PCT/US2015/051513".
"Office Action from USPTO dated Sep. 8, 2017 for U.S. Appl. No. 14/830,045".

* cited by examiner

METHODS AND SYSTEMS FOR ACCESSING STORAGE USING A NETWORK INTERFACE CARD

CROSS-REFERENCE TO RELATED APPLICATIONS

This patent application claims priority of U.S. Provisional Patent Application, Ser. No. 62/075,158 filed on Nov. 4, 2014, the disclosure of which is incorporated herein by reference in its entirety.

TECHNICAL FIELD

The present disclosure relates to storage systems and, more particularly, to accessing a storage device of a computing system via a network interface card (NIC).

BACKGROUND

Computing devices (or systems) use mass storage devices to store data. Different storage options are available for computing devices to store data and retrieve data, for example, direct-attached storage (DAS), network attached storage (NAS), and storage area networks (SANs). A DAS system typically includes a plurality of storage drives/devices that are directly attached to a computing device (for example, a server) Common protocols used for DAS storage devices are SCSI (Small Computer Systems Interface), ATA (AT attachment), SATA (Serial ATA), SAS (Serial Attached SCSI), NVMe (Non-Volatile memory express or the "Non-Volatile Memory Host Controller Interface" Specification), and others.

In conventional target systems, for processing input/output requests, a network packet is received by a network interface card (NIC) of a target and then delivered to a central processing unit (CPU) of the target system for processing. The CPU processes the packet, accesses the storage device and then sends a response to an initiator via the NIC. The operating rate of network and storage devices, continue to increase at a much faster rate than the rate at which CPUs are increasing their performance. Horizontally scaling server CPU operating rates is costly and can consume a lot of power. For example, to access a FLASH based storage over a 100 GbE at line speeds, one will need a very expensive and "high end server." Continuous efforts are being made to improve storage access.

SUMMARY

The present aspects have several features, no single one of which is solely responsible for their desirable attributes. Without limiting the scope of the present aspects as expressed by the claims that follow, their more prominent features now will be discussed briefly. After considering this discussion, and particularly after reading the section entitled "Detailed Description," one will understand how the features of the present aspects provide the advantages described herein.

In one aspect, a machine implemented method is provided. The method includes receiving a write request at a network interface card (NIC) coupled to a storage device via a peripheral link and accessible to a processor of a computing device executing instructions out of a memory device; translating the write request by the NIC to a storage device protocol used by the storage device coupled to the NIC; notifying the storage device of the write request by the NIC, without using the processor of the computing device; writing data for the write request by the storage device; notifying the NIC directly by the storage device that data has been written; and preparing a response to the write request by the NIC without having to use the processor of the computing device.

In another aspect, another machine-implemented method is provided. The method includes receiving a read request at a NIC coupled to a storage device via a peripheral link and accessible to a processor of a computing device executing instructions out of a memory device; translating the read request by the NIC to a storage device protocol used by the storage device coupled to the NIC, when there is no cache hit; notifying the storage device of the read request by the NIC, without using the processor of the computing device; notifying the NIC directly by the storage device that data has been written at a memory device; and preparing a response to the read request by the NIC without having to use the processor of the computing device.

In yet another aspect, a system is provided. The system includes a NIC coupled to a storage device via a peripheral link and accessible to a processor of a computing device executing instructions out of a memory device, where the NIC is configured to receive a write request to write data; translate the write request to a storage device protocol used by the storage device coupled to the NIC; notify the storage device of the write request, without using the processor of the computing device, where the storage device writes the data and notifies the NIC that data has been written; and then the NIC prepares a response to the write request without having to use the processor of the computing device.

This brief summary has been provided so that the nature of the invention may be understood quickly. A more complete understanding of the present disclosure can be obtained by reference to the following detailed description of the various aspects thereof concerning the attached drawing

BRIEF DESCRIPTION OF DRAWINGS

The present aspects relating to the management of network elements now will be discussed in detail with an emphasis on various advantageous features. These novel and non-obvious aspects are depicted in the accompanying drawings, which are for illustrative purposes only. These drawings include the following figures, in which like numerals indicate like parts.

DETAILED DESCRIPTION

Figure 1A:
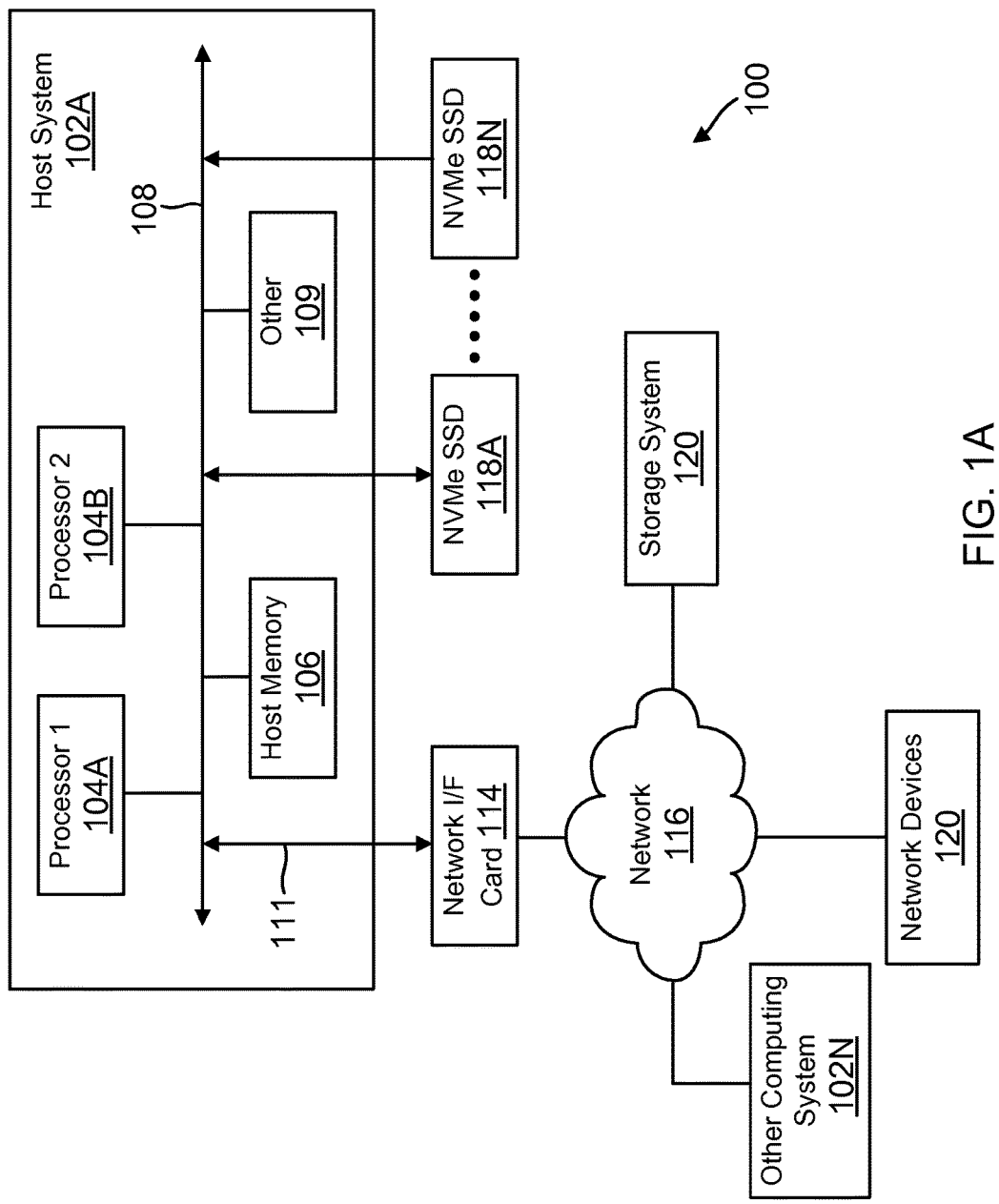
FIG. 1A is a functional block diagram of a system, according to one aspect of the present disclosure.

The following detailed description describes the present aspects with reference to the drawings. In the drawings, reference numbers label elements of the present aspects. These reference numbers are reproduced below in connection with the discussion of the corresponding drawing features.

As a preliminary note, any of the aspects described with reference to the figures may be implemented using software, firmware, hardware (e.g., fixed logic circuitry), or a combination of these implementations. The terms "logic," "module," "component," "system," and "functionality," as used herein, generally represent software, firmware, hardware, or a combination of these elements. For instance, in the case of a software implementation, the terms "logic," "module," "component," "layer," "system," and "functionality" represent executable instructions that perform specified tasks when executed on a hardware-based processing device or devices (e.g., CPU or CPUs). The program code can be stored in one or more non-transitory, computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of medium for retaining information in any form, including various kinds of storage devices (magnetic, optical, static, etc.).

The aspects disclosed herein may be implemented as a computer process (method), a computing system, or as an article of manufacture, such as a computer program product or computer-readable media. The computer program product may be non-transitory, computer storage media, readable by a computer device, and encoding a computer program of instructions for executing a computer process. The computer program product may also be readable by a computing system, and encoding a computer program of instructions for executing a computer process.

System 100:

FIG. 1A is a block diagram of a system 100 configured for use with the various aspects of the present disclosure. System 100 may include a plurality of computing systems 102A-102N (may also be referred to as server(s) 102 or host system(s) 102), used according to one aspect of the present disclosure. The computing system 102A may include one or more processors 104A-104B (referred to as processor 104 or processors 104), also known as central processing units (CPUs). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. Processor 104 executes machine-implemented instructions (or process steps/blocks) out of a memory 106 that interfaces with an interconnect 108 (may be referred to as a computer bus 108). The computer bus 108 may be, for example, a system bus, a Peripheral Component Interconnect (PCI) bus, a PCI-Express (PCIe) bus, a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other type of bus, including a memory bus that enables connecting a memory to a memory controller in computer systems.

The host system 102A may further have access to one or more storage devices 118A-118N (may be referred to as storage 118), which may include, for example, a non-volatile memory solid state storage device (referred to herein as an example, NVMe SSD 118), a hard disk (HDD) or any other storage device type (for example, a hybrid drive, a hard drive and others) for storing structured or unstructured data. NVMe is an industry standard that enables connection to a SSD coupled by a PCI-Express link. Storage 118 may store data containers, for example, files, structured and unstructured data, as described below in detail.

Memory 106 also interfaces with the computer bus 108 to provide the processor 104 with access to memory storage. Memory 106 may include random access memory (RAM). When executing stored computer-executable process steps from storage 108, the processor 104 may store and execute the process steps out of memory 106. Read only memory (ROM, not shown) may also be used to store invariant instruction sequences, such as startup instruction sequences or basic input/output system (BIOS) sequences for operation of a keyboard (not shown). Memory 106 may also be used by processor 104 to cache data, as described below. Memory 106 may also be used to store a plurality of queues used by other devices to communicate, as described below in detail.

The host system 102A also includes other devices and interfaces 109, which may include a display device interface, a keyboard interface, a pointing device interface, and others. The details of these components are not germane to the inventive aspects disclosed herein.

Various network and storage protocols may be used by host system 102A to handle network and storage traffic, for example, Ethernet, Fibre Channel, Fibre Channel over Ethernet (FCoE), Internet over Small Computer System Interface (iSCSI), Remote Direct Memory Access (RDMA) and others. Some of these common protocols are described below.

Ethernet IEEE 802.3 is a common network protocol used for network communication. The original Ethernet bus or star topology was developed for local area networks (LAN) to transfer data at 10 Mbps (megabits per second). Newer Ethernet standards (for example, Fast Ethernet (100 Base-T) and Gigabit Ethernet) support data transfer rates that are greater than 1 gigabit (Gb). The various aspects described herein may use Ethernet (which includes 100 Base-T and/or Gigabit Ethernet) as the network protocol. However, the adaptive aspects disclosed herein are not limited to any particular protocol, as long as the functional goals are met by an existing or new network protocol.

Fibre Channel (may also be referred to as "FC") is a common technology used in SANs. Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected. Fibre Channel fabric devices include a node port or "N_Port" that manages Fabric connections. The N_port establishes a connection to a Fabric element (e.g., a switch) having a fabric port or F_port.

Fibre Channel over Ethernet (FCoE) has been developed to handle both Ethernet and Fibre Channel traffic in a storage area network (SAN). This functionality would allow Fibre Channel to leverage high speed, for example, 10 Gigabit Ethernet networks while preserving the Fibre Channel protocol.

iSCSI is an IP-based storage networking standard for linking data storage facilities. By carrying SCSI commands over IP networks, iSCSI is used to facilitate data transfers over intranets and to manage storage over long distances. iSCSI can be used to transmit data over local area networks (LANs), wide area networks (WANs), or the Internet and can enable location-independent data storage and retrieval. The protocol allows clients to send SCSI commands (referred to as command or (control) data blocks (CDBs) to SCSI storage devices (may be referred to as targets) on remote servers. iSCSI is a SAN-based protocol, allowing organizations to consolidate storage into data center storage arrays while providing hosts (such as database and web servers) with the illusion of locally attached disks. Unlike traditional Fibre Channel, which uses special-purpose cabling, iSCSI can be run over long distances using existing network infrastructure.

In one aspect, computing system 102A uses a network interface card (NIC) 114 to communicate with other devices and systems, for example, network devices 120 and storage system 120 via a network 116. Network 116 may be the Internet, a local area network, a wireless network or any other network type. NIC 114 may also be used to communicate with storage 118 via a PCI-Express link 111, as described below in detail.

Figure 1B:
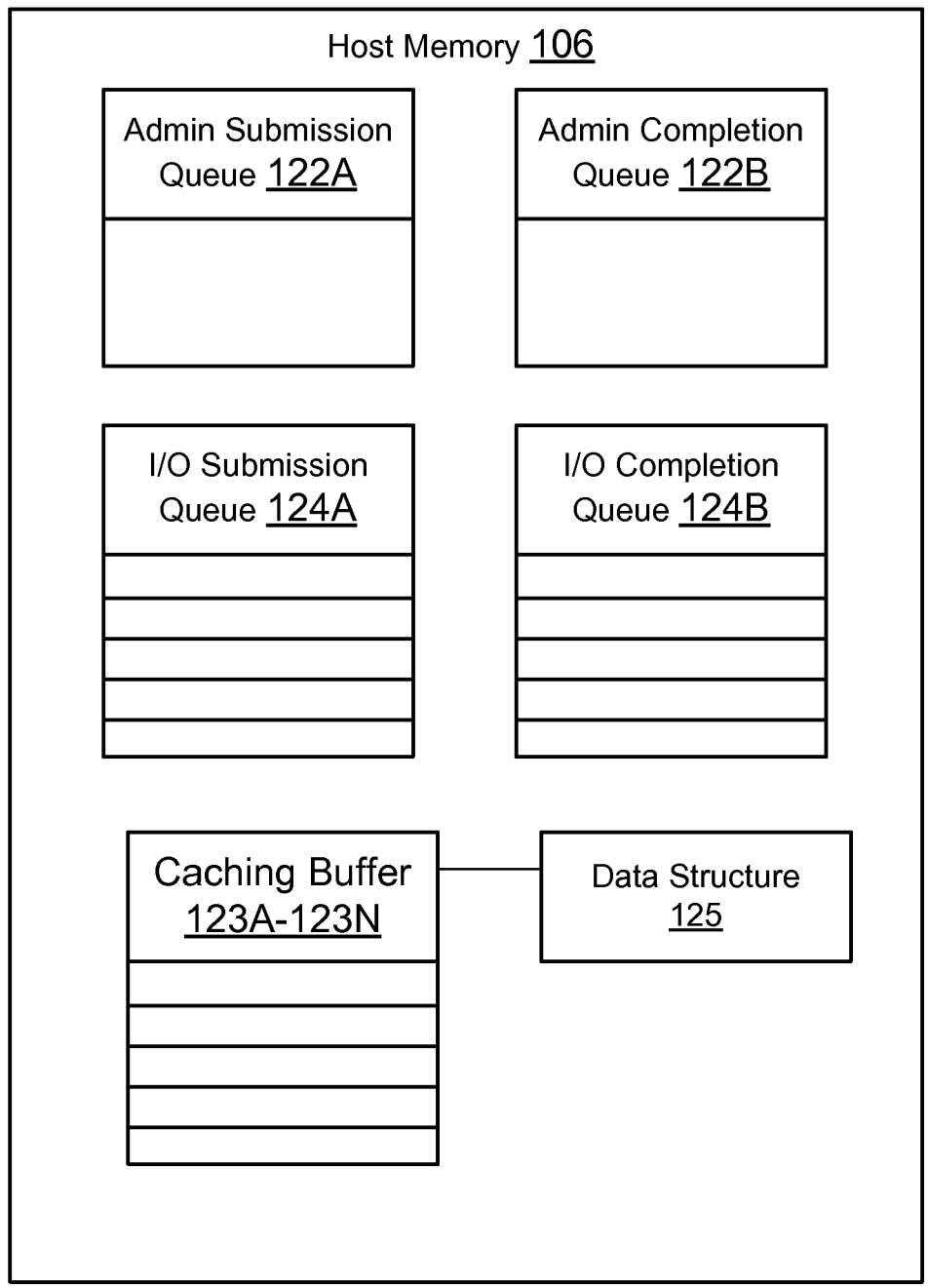
FIG. 1B shows an example of queues that are used by a network interface card (NIC) to directly communicate with a storage device, according to one aspect of the present disclosure.

FIG. 1B shows an example of certain queues that are maintained at host memory 106, according to one aspect of the present disclosure. As an example, an administration submission queue 122A and an administration completion queue 122B are used for sending messages for management related tasks. For example, creating an input/output (I/O) submission queue that is described below in detail.

Host memory 106 also includes an I/O submission queue 124A and completion queue 124B that are used by NIC 114 to access storage 118 (or host memory 106) via a PCI-Express link or host memory 106. The submission queue 124A may be used by NIC 114 to send a message to storage 118 to read and/or write data. The completion queue may be used by storage 118 to post a completion message for the NIC 114. The term queue as used herein means one or more memory storage slots/locations, where messages are posted. It is noteworthy that the queues of FIG. 1B may be maintained at NIC memory 132 and/or storage 118 for executing the process blocks described herein.

Host memory 106 may also be used to cache data for responding to read requests. The data may be cached at buffers 123A-123N. The host memory maintains a caching data structure 125 to track what is stored at caching buffers 123A-123N.

Figure 1C:
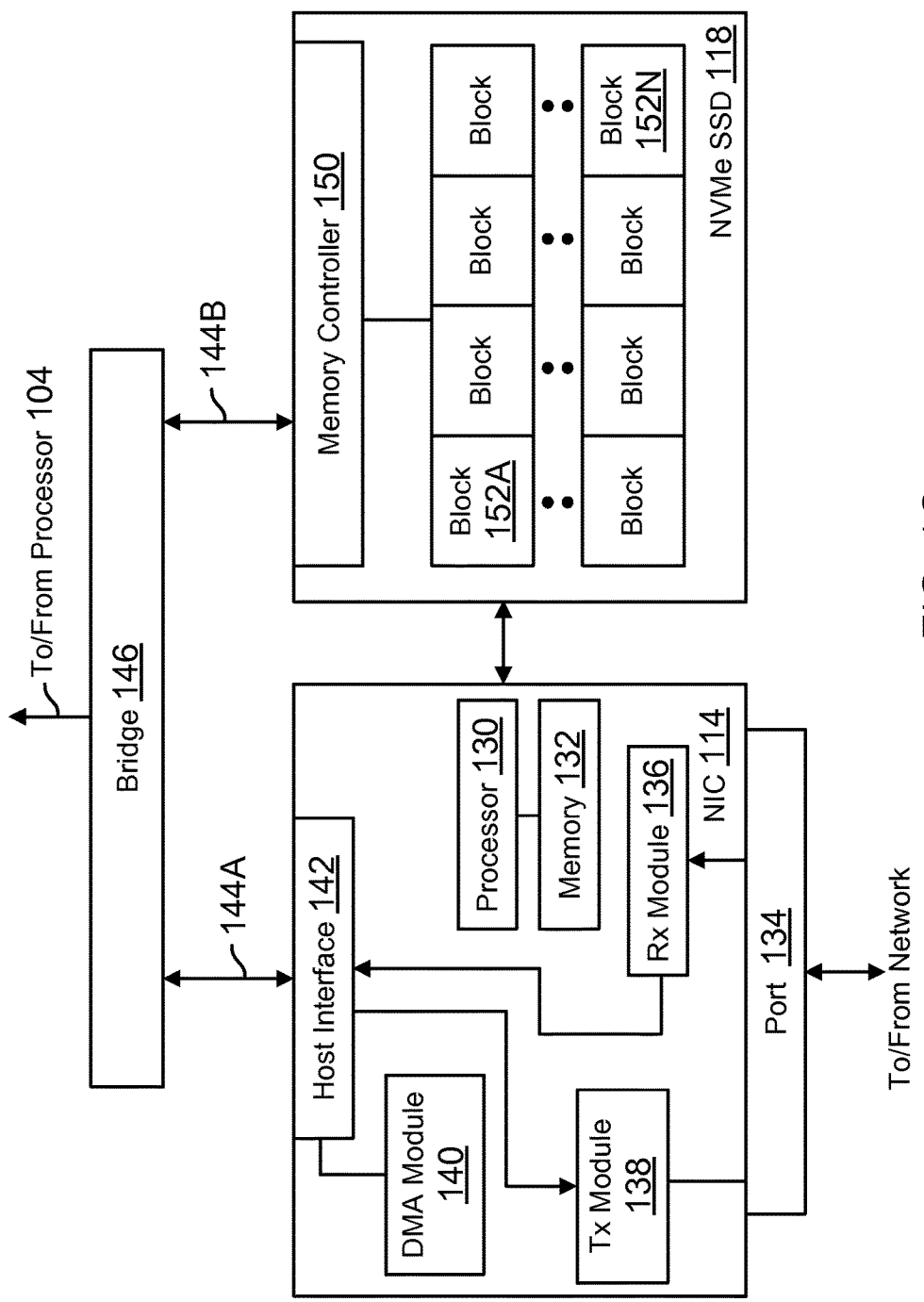
FIG. 1C shows a block diagram of the NIC and the storage device, according to one aspect.

FIG. 1C shows details of NIC 114 and storage 118, according to one aspect. A PCI-Express bridge 146 may be used to connect to NIC 114 and storage 118 via links 144A/114B. The bridge 146 may be connected to computer bus 108. NIC 114 includes a host interface 142 for sending information to host memory 106 and receiving information from host memory 106. A direct memory access (DMA) module 140 is used to receive data from host memory 106 and send data for host memory 106 queues. NIC 114 includes a processor 130 having access to memory 132. Memory 132 may be used to store NIC 114 firmware instructions as described below in detail.

NIC 114 includes a port 134 for sending and receiving information from network 134. Port 134 may be coupled to an Ethernet link or any other network link for receiving and transmitting network information (also referred to as frames). Port 134 includes logic and circuitry to receive and send network information complying with one or more protocols.

NIC 114 includes a receive module 136 to temporarily stored information received from the network, while transmit module 138 is used to temporarily store information, before it is transmitted via port 134.

Storage 118 includes a memory controller 150 that stores information at storage blocks 152A-152N. Memory controller 150 may include a processor and a memory for storing instructions (not shown). Memory controller 150 is configured to store information at the storage blocks, retrieve stored information and update messages for NIC 114 at the completion queue 124A. Details of using storage 118 by NIC 114 are described below.

Figure 2:
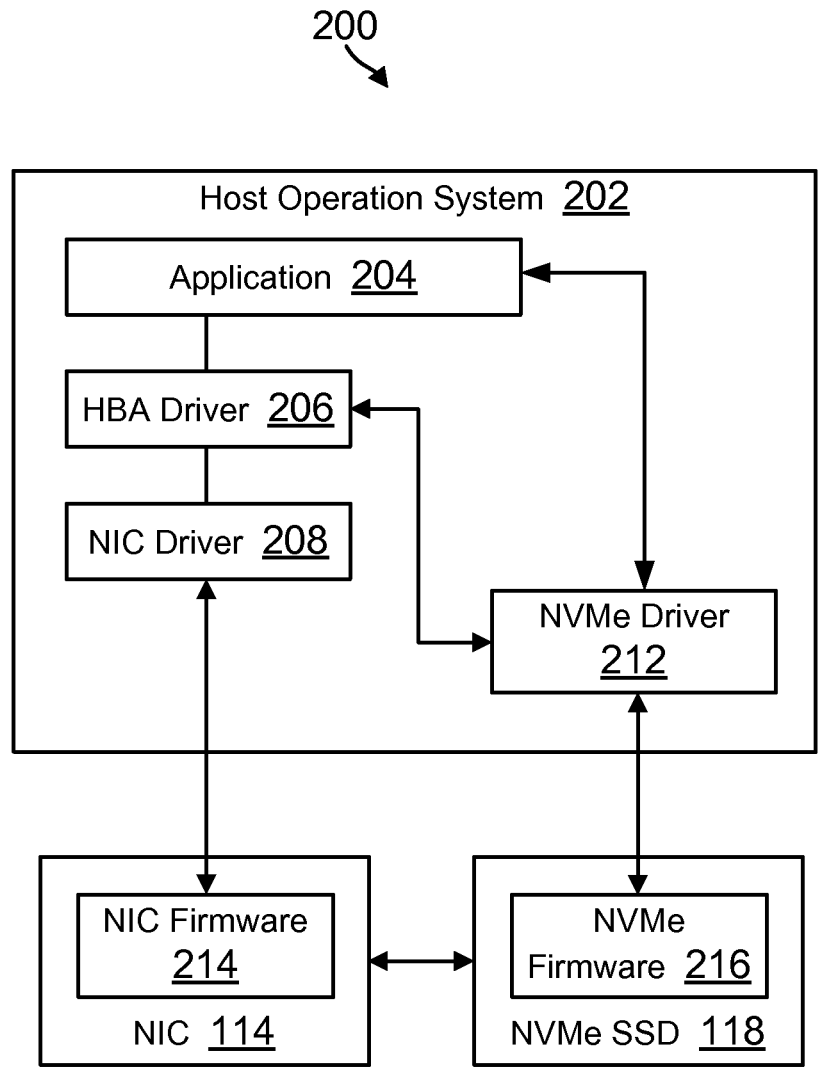
FIG. 2 shows an example of a software architecture, used according to one aspect of the present disclosure.

FIG. 2 shows a high-level block diagram showing the software architecture used according to one aspect of the present disclosure. Although described in terms of software and/or firmware, it is noteworthy that these modules may be implemented in a variety of other ways, including hardware, as described above and understood by those of skill in the art.

Host system 102A executes an operating system 202, such as, for example and without limitation, Linux based OS, UNIX, iOS, Microsoft® Windows, Android OS, or the like. The operating system 202 manages various applications, such as application 204. As an example, application 204 may be an email, database or any other application type that may be used to generate I/O requests to read and write information.

Host system 202 executes a host bus adapter (HBA) driver 206 that interfaces with a NVMe driver 212. The connection between the HBA driver 206 and NVMe driver 212 may be used to setup new queues. This may not be used for data transfer operations. The NVMe driver 212 may also interface directly with the application 204. This allows the application 204 to directly access storage 118, when any I/O operation is not offloaded to NIC 114.

The NVMe driver 212 interfaces with the NVMe firmware 216 that is executed by the NVMe memory controller 150 out of a memory device (not shown). Driver 206 also communicates with NIC 114 directly or through NIC driver 208. The NIC driver 208 is used to interface with the NIC firmware 214 executed out of NIC memory 132 by NIC processor 130. Details of using the various modules of FIG. 2 are described below.

When a network packet is received by NIC 114, it translates a network storage device protocol (for example, iSCSI, FCoE, RDMA and others) to a storage device protocol, for example, NVMe or AHCI (Advanced Host Controller Interface). AHCI is a technical standard developed by Intel Corp. that specifies the operation of Serial ATA (SATA) host bus adapters. NIC 114 also performs validation of incoming read and write requests.

When a packet with a read/write command is received, NIC 114 generates a doorbell message for storage 118. This may be enabled by using a MSI-X (Message Signaled Interrupts) defined by the PCI-Express specification. An interrupt message is written to a PCI-Express address of the storage 118 that generates a doorbell message for an assigned submission queue 124A/124B. The message data includes a submission queue tail or the message triggers reading of the submission queue tail. As an example, interrupts/doorbell messages may be aggregated because the difference between a last sequential write and a current sequential write indicates a number of commands that may have been added to the submission queue.

When any command is completed by the storage device 118, it generates a doorbell message for the NIC 114. This may be enabled by modifying the MSI-X interrupt where an interrupt message is written to a PCIe address for the NIC 114 (submission queue 124B). The message includes a completion tail queue or triggers a reading of the completion queue tail.

When a completion queue 124B entry is completed by NIC 114, a storage device message doorbell is generated as described above. In one aspect, submission queue 124A, completion queue 124B and host memory data buffers may be mapped to a NIC address space instead of a host memory to improve performance. In another aspect, the mapping is based on an address space for the storage device.

In addition to read/write access to storage 118 may also be cached at host memory 106. In such an instance, as described below, host memory repeated cache requests are accelerated as they are served directly from the host memory 106.

Figure 3:
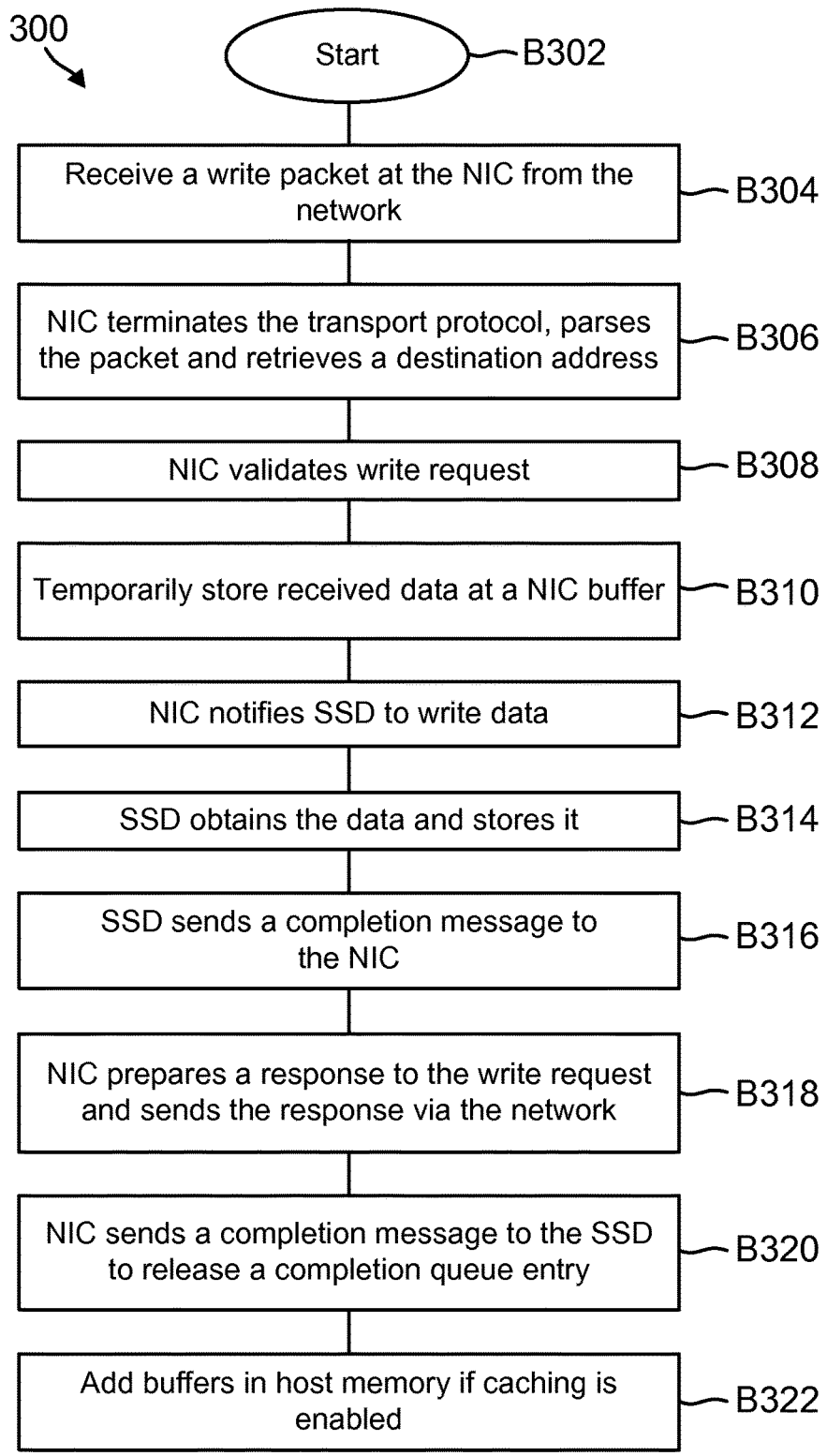
FIGS. 3 and 4 show process flow diagrams for reading and writing data, according to various aspects of the present disclosure.

Process Flow:

FIG. 3 shows a process 300, according to one aspect. The process begins in block B302 when host system 102A is operational and initialized. NIC 114 and storage 118 are initialized and operational as well. In one aspect, a network packet is received by port 134 in block B304. The network packet may be to write information i.e. a write I/O request. In block B306, NIC 114 terminates a transport protocol, parses the packet and obtains a destination address from the packet.

In block B308, the NIC 114 validates the request, for example, validates a sender, access rights for the requested address and others. In one aspect, NIC 114 may store an access control data structure that may be used for validating the request and/or sender.

In block B310, the received packet is stored at the receive module 136 or any other location that is accessible to NIC 114. The data may then be stored at host memory 106. In block B312, NIC 114 notifies the storage device 118 to write the data. In one aspect, NIC 114 writes to the I/O submission queue 124A, which triggers a doorbell message for storage 118 using PCI-Express based peer to peer communication. In response to the doorbell message, in block B314, storage 118 memory controller obtains the data from host memory and then writes it one of the storage blocks at storage 118. In block B316, storage 118 post a completion message at the completion queue 124B. In block B318, NIC 114 prepares a response packet to the write request and then sends the response via the network. Host system 102A processing resources are saved because NIC 114 interfaces with storage 108 and to the source that originated the write request.

Thereafter, in block B320, NIC 114 sends a completion message to storage 118 so that the storage device 118 can release a completion queue entry associated with the write request. If caching is enabled, then in block B322, buffers are registered in host memory, otherwise, buffers are released.

Figure 4:
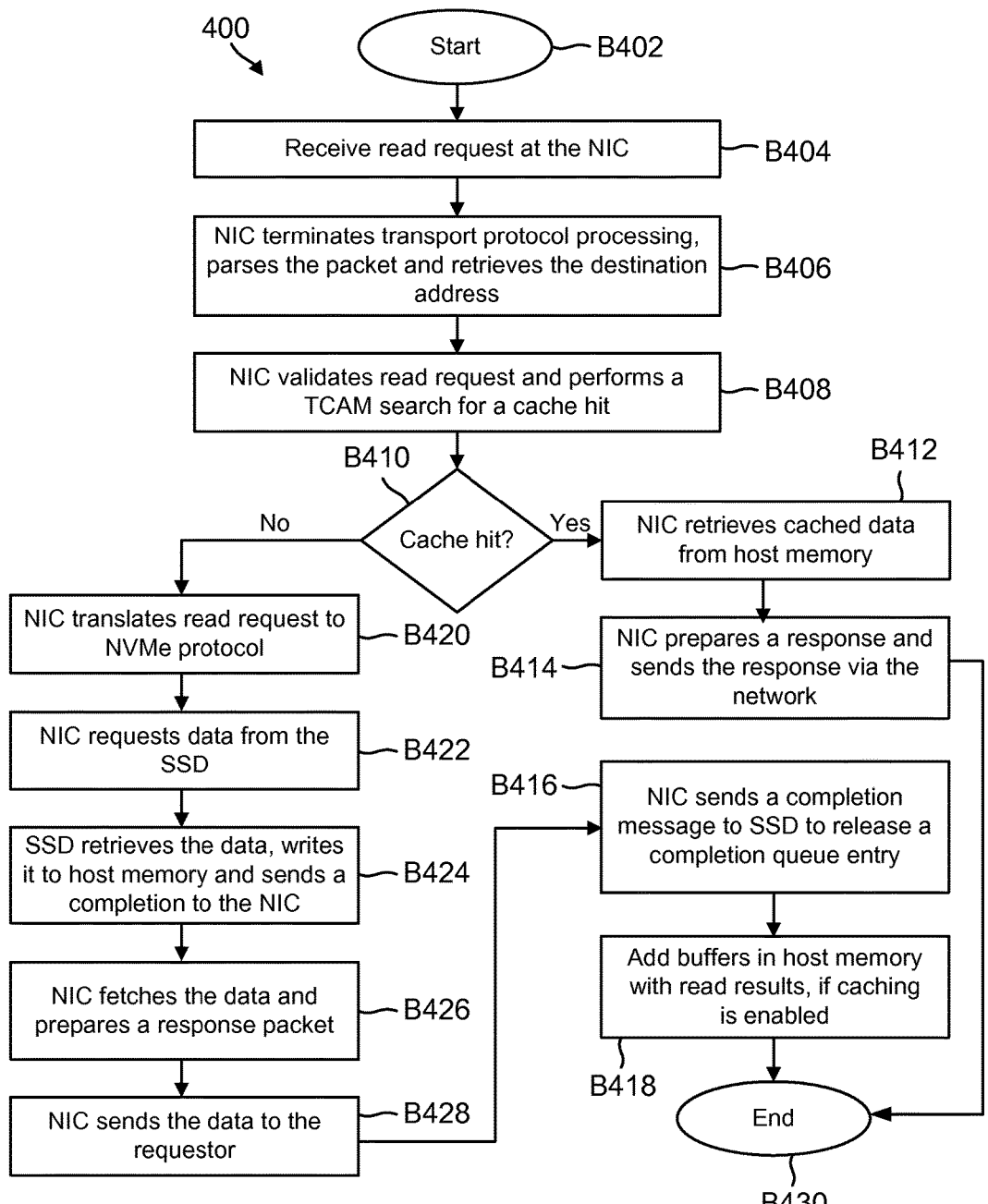

FIG. 4 shows a process flow 400 for reading data, according to one aspect of the present disclosure. The process begins in block B402, when the host system 102A, NIC 114 and storage 118 are all initialized and operational. In block B404, a read request is received by NIC 114. The read request may be for reading data stored at storage 118. In block B406, the NIC 114 terminates the transport protocol processing, parses the received request and retrieves the destination address, which includes the section of a storage device (SCSI LUN) and the SCSI LBA. In block B408, NIC 114 validates the read request (for example, the sender, access rights and others). A search is performed to determine if the requested data is at a cache managed by the host system.

In block B410, the NIC 114 determines if there is a cache hit. This may be determined by using the cache data structure 125 that stores the SCSI LUN and SCSI LBA information, when data is cached at host memory 106.

If there is a cache hit, then in block B412, NIC 114 retrieves cached data from host memory. DMA module 140 is used to access the host memory and retrieve the cached data. In block B414, NIC 114 prepares a response packet with the requested data. The response packet is then sent to the source via network 116. The process then ends in block B430.

If there was no cache hit in block B410, then in block N420, NIC 114 translates the read request to the NVMe protocol described by the NVMe SCSI Translation reference. In block B422, NIC 114 requests data from the storage 118. In one aspect, NIC 114 writes to the submission queue 124A which triggers a door bell message using PCI-Express based communication. In block B424, the SSD retrieves the data and writes the data to a host memory 106 location. The storage device 118 then sends a completion doorbell message at completion queue 124B. In block B426, NIC 114 fetches the data and then prepares a response for the source that requested the data. The data is sent to the source or requestor in block B428. The process then moves to block B416, when buffers are registered in host memory with read results, if caching is enabled. The process then ends in block B430.

In one aspect, the NIC 114 off loads processing of read requests, when data is cached at the local memory. In another aspect, NIC 114 also offloads processing read and write requests at the local NVMe storage devices or any other storage device.

Although the present disclosure has been described with reference to specific aspects, these aspects are illustrative only and not limiting. For example, although the description above has been described with respect to a NIC, any other device may be configured to perform the foregoing function. Thus the term NIC, adapter and device are interchangeable. Many other applications and aspects of the present disclosure will be apparent in light of this disclosure and the following claims. References throughout this specification to "one aspect" or "an aspect" means that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

What is claimed is:

1. A machine-implemented method, comprising:
receiving a write request at a network interface card (NIC) to write data, the NIC coupled to a storage device via a peripheral link, and the NIC accessible to a processor of a computing device executing instructions out of a memory device;
translating the write request by the NIC from a network protocol to a storage device protocol, the storage device protocol used by the storage device that is coupled to the NIC by the peripheral link, for storing data;

temporarily storing the data for the write request at the memory device by the NIC;

notifying the storage device by the NIC of the write request and the data for the write request temporarily stored at the memory device, using the peripheral link for peer to peer communication, without using the processor of the computing device;

obtaining the data for the write request from the memory device by a memory controller of the storage device and then writing the data for the write request by the memory controller to the storage device;

notifying the NIC directly by the storage device that the data for the write request has been written using the peripheral link for peer to peer communication;

preparing a response to the write request by the NIC without having to use the processor of the computing device; and sending a completion message to the storage device by the NIC after the response is sent and then releasing by the storage device a completion queue entry associated with the write request, such that the released completion queue entry is reused for other requests.

2. The method of claim 1, wherein to communicate with the storage device, the NIC generates a doorbell message using a message signaled interrupt (MSI-X) for an address space of the storage device.

3. The method of claim 1, wherein the storage device is a non-volatile memory express (NVMe) based solid state storage device.

4. The method of claim 1, wherein the memory device maintains a submission queue for the NIC to post a message for the storage device via the peripheral link and the storage device accesses the memory device to obtain the message via the peripheral link.

5. The method of claim 1, wherein the memory device maintains a completion queue for the storage device to post a completion message for the NIC and the NIC accesses the memory device to obtain the completion message via the peripheral link.

6. The method of claim 1, further comprising:
terminating a network protocol processing by the NIC prior to translating the write request; and
validating the write request for authorized access.

7. The method of claim 1, wherein to communicate with the NIC, the storage device generates a doorbell message using a message signaled interrupt (MSI-X) for an address space of the NIC assigned at the memory device.

8. A machine-implemented method, comprising:
receiving a read request at a network interface card (NIC) to read data, the NIC coupled to a storage device via a peripheral link and the NIC accessible to a processor of a computing device executing instructions out of a memory device;

parsing the read request by the NIC and determining by the NIC a destination address of the data for the read request;

validating the read request by the NIC;

determining by the NIC if there is a cache hit indicating that data for the read request is stored at a cache maintained by the memory device;

translating the read request by the NIC to a storage device protocol used by the storage device coupled to the NIC for storing the data, when there is no cache hit;

notifying the storage device of the read request by the NIC using the peripheral link for peer to peer communication, without using the processor of the computing device;

writing the data for the read request from the storage device to the memory device by a memory controller of the storage device using the peripheral link;

notifying the NIC directly by the storage device that data has been written at the memory device using the peripheral link for peer to peer communication;

obtaining the data for the read request from the memory device by the NIC; and preparing a response to the read request by the NIC with the data obtained from the memory device, without having to use the processor of the computing device.

9. The method of claim 8, wherein to communicate with the storage device, the NIC generates a doorbell message using a message signaled interrupt (MSI-X) for an address space of the storage device.

10. The method of claim 8, wherein the storage device is a non-volatile memory express (NVMe) solid state storage device.

11. The method of claim 8, wherein the NIC obtains data for the read request from the memory device, when there is a cache hit, without having to access the storage device.

12. The method of claim 8, wherein the memory device maintains a submission queue for the NIC to post a message for the storage device and the storage device accesses the memory device to obtain the message.

13. The method of claim 8, wherein the memory device maintains a completion queue for the storage device to post a completion message for the NIC and the NIC accesses the memory device to obtain the completion message.

14. The method of claim 8, wherein to communicate with the NIC, the storage device generates a doorbell message using a message signaled interrupt (MSI-X) for an address space of the NIC.

15. A system comprising:
a network interface card (NIC) coupled to a storage device via a peripheral link and accessible to a processor of a computing device executing instructions out of a memory device, where the NIC is configured to receive a write request to write data; translate the write request from a network protocol to a storage device protocol used by the storage device coupled to the NIC by a peripheral link for storing data; temporarily store the data for the write request at the memory device; notify the storage device of the write request and the data for the write request stored at the memory device, using the peripheral link for peer to peer communication, without using the processor of the computing device, where a memory controller of the storage device obtains the data for the write request from the memory device, writes the data at the storage device and notifies the NIC that the data for the write request has been written using the peripheral link for peer to peer communication; and then the NIC prepares a response to the write request without having to use the processor of the computing device; sends a completion message to the storage device and the storage device releases a completion queue entry associated with the write request, such that the released completion queue entry is reused for other requests.

16. The system of claim 15, wherein to communicate with the storage device, the NIC generates a doorbell message using a message signaled interrupt (MSI-X) for an address space of the storage device.

17. The system of claim 15, wherein the storage device is a non-volatile memory express (NVMe) solid state storage device.

18. The system of claim 15, wherein the memory device maintains a submission queue for the NIC to post a message for the storage device via the peripheral link and the storage device accesses the memory device to obtain the message via the peripheral link.

19. The system of claim 15, wherein the memory device maintains a completion queue for the storage device to post a completion message for the NIC and the NIC accesses the memory device to obtain the completion message via the peripheral link.

20. The system of claim 15, wherein the NIC parses the write request to obtain a destination address without having to use the processor.

21. The system of claim 15, wherein to communicate with the NIC, the storage device generates a doorbell message using a message signaled interrupt (MSI-X) for an address space of the NIC.

\* \* \* \* \*